(12) United States Patent
Shelbourne

(10) Patent No.: US 6,315,659 B1
(45) Date of Patent: Nov. 13, 2001

(54) CROP STRIPPERS AND STRIPPER TOOTHING

(75) Inventor: Keith Howard Shelbourne, Pakenham (GB)

(73) Assignee: Shelbourne Reynolds Engineering (GB)

(*) Notice: Subject to any disclaimer, the term of this patent is extended or adjusted under 35 U.S.C. 154(b) by 0 days.

(21) Appl. No.: 09/358,857

(22) Filed: Jul. 22, 1999

(30) Foreign Application Priority Data

Jul. 24, 1998 (GB) .................................................. 9816213

(51) Int. Cl.[7] .................................................. A01F 12/00
(52) U.S. Cl. .................................................. 460/122; 56/126
(58) Field of Search .................................... 460/122, 113, 460/121; 56/128, 14.6, 126, DIG. 1

(56) References Cited

U.S. PATENT DOCUMENTS

| | | |
|---|---|---|
| 2,231,354 | 2/1941 | Wilcox . |
| 2,481,652 | 9/1949 | Fort . |
| 4,671,051 * | 6/1987 | Klinner ................. 56/16.4 |
| 4,790,128 * | 12/1988 | Klinner ................. 56/364 |
| 4,951,451 * | 8/1990 | Klinner ................. 56/16.5 |
| 4,951,453 * | 8/1990 | Klinner ................. 56/364 |
| 4,991,385 * | 2/1991 | Klinner ................. 56/364 |
| 5,036,653 * | 8/1991 | Klinner ................. 56/130 |
| 5,044,147 * | 9/1991 | Klinner ................. 56/14.6 |
| 5,111,645 * | 5/1992 | Klinner ................. 56/364 |
| 5,175,984 | 1/1993 | Hale et al. . |
| 5,299,413 * | 4/1994 | Gale ................. 56/10.2 |
| 5,389,038 | 2/1995 | Shelbourne et al. . |
| 5,438,818 * | 8/1995 | Shelbourne et al. ................. 56/220 |

FOREIGN PATENT DOCUMENTS

| | | |
|---|---|---|
| 0 241 276 | 4/1986 | (EP) . |
| 2 188 822 | 12/1990 | (GB) . |
| WO 86/01972 | 4/1986 | (WO) . |
| WO 88/04885 | 7/1988 | (WO) . |
| WO 88/05626 | 8/1988 | (WO) . |
| WO 89/11784 | 12/1989 | (WO) . |
| WO 92/03037 | 3/1992 | (WO) . |
| WO 96/04776 | 2/1996 | (WO) . |
| WO 92/08339 * | 5/1992 | (WO) ................. 56/220 |

* cited by examiner

*Primary Examiner*—Robert E. Pezzuto
*Assistant Examiner*—Árpád Fábián. Kovács
(74) *Attorney, Agent, or Firm*—Larson & Taylor, PLC

(57) ABSTRACT

A crop stripper has a rotor provided with metal stripping teeth. The teeth each have an outwardly tapering outer portion extending from a radially inner root portion of arcuate form which provides a root opening between adjacent teeth wider than the spacing between the teeth at the junctions of the inner and outer portions. Along each outer portion the edges of the teeth have flanging which terminates short of the inner portions. The flanging extends over not substantially more than 70%, preferably not more than 60%, of the length of the teeth. The stripping teeth are supported by shorter and thicker backing teeth placed behind the stripping teeth in the direction of rotation of the rotor.

25 Claims, 2 Drawing Sheets

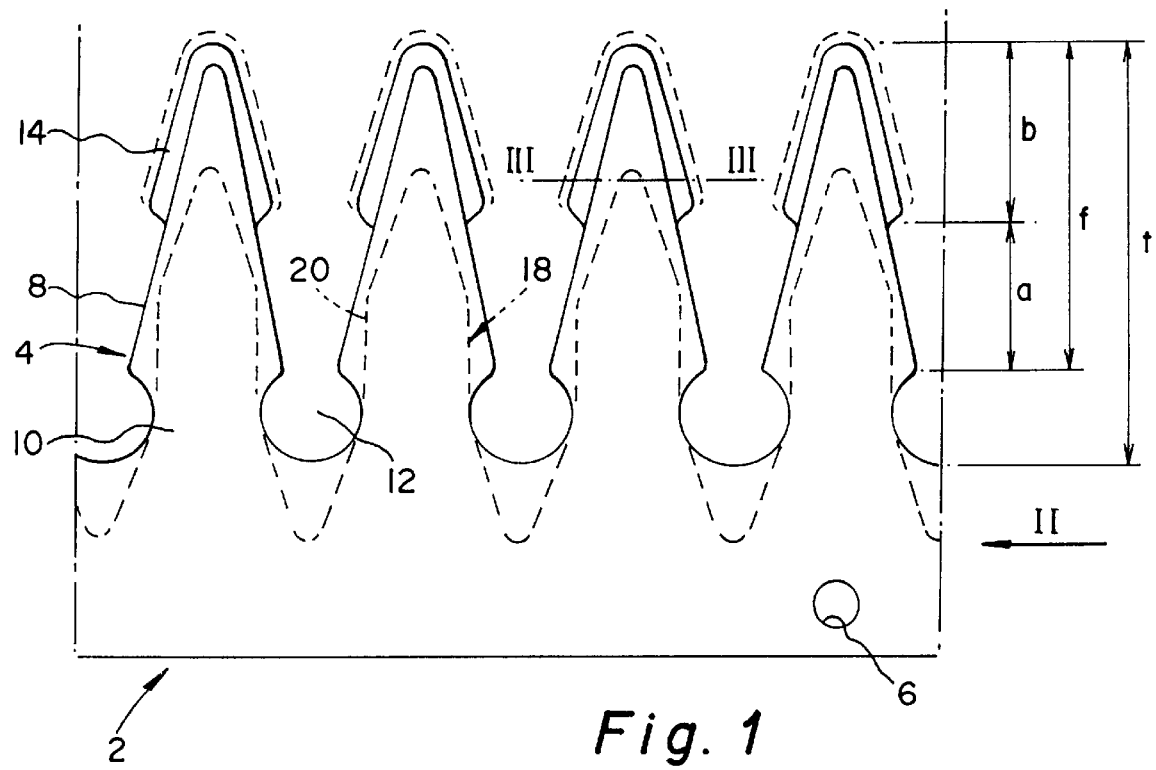
Fig. 1
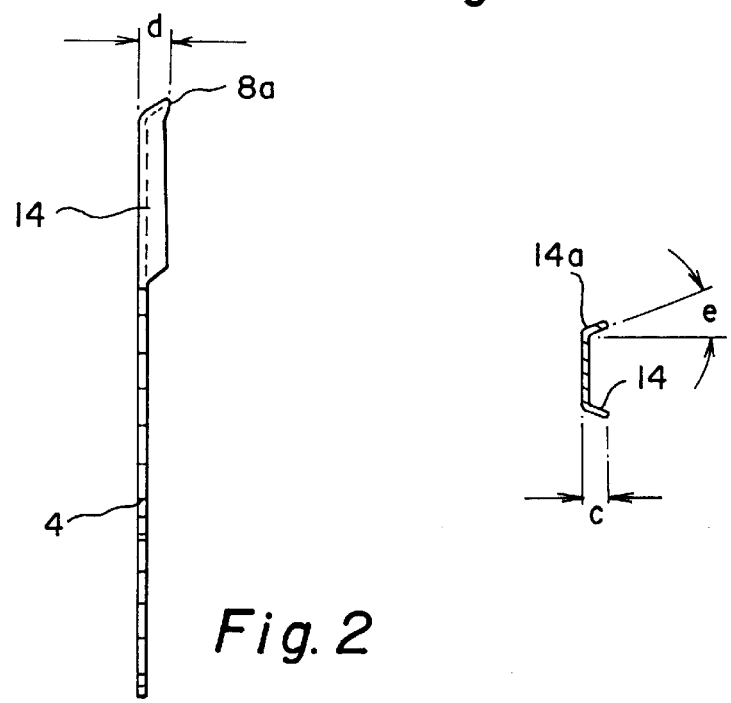
Fig. 2
Fig. 3

CROP STRIPPERS AND STRIPPER TOOTHING

BACKGROUND OF THE INVENTION

This invention relates to crop strippers for harvesting crops from standing plants, and in particular to the rotors of such strippers used for detaching the crops from the plants, and to the toothing of the rotors which perform this function.

Crop strippers are best known for stripping grain from the heads of cereal crops such as wheat, and feed from herbage crops such as grass, but they can also be arranged to harvest other grain or seed crops, or to strip other parts of plants, such as leaves, young shoots or blossom from the stems of crops.

The rotor of a crop stripper has stripper teeth projecting from its periphery, arranged in a series of transversely extended rows or combs, each row usually being made up of a number of similar comb plates, butted end to end. Although many different tooth forms have been proposed in the literature, in practice the customary tooth profile comprises a radially outwardly tapering outer portion extending from a radially inner portion in which the spacing between adjacent teeth increases to form a bulbous root opening having a maximum width greater than the width of a radially outer neck of the opening at the junction with the tapering outer portions of the teeth.

In the operation of the crop stripper, the rotor is driven as the machine advances through the standing crop, the lower periphery of the rotor turning in the direction of advance, and the plant stems are trapped in the spaces between the projecting teeth. As the stems are drawn through the teeth, the grain or other crop is stripped from the stems.

The efficiency of operation is dependent, to some extent at least, on the ability of the stripper teeth to minimise the amount of unwanted material that is taken up in addition to the crop parts being harvested. For this reason, it has been customary to make the comb plates of a thermoplastic material, which causes little, if any, damage to the crop stems that will detach them. The comb plates are thick enough to be relatively stiff yet they have a sufficient degree of elasticity to avoid permanent deformation if a tooth strikes an obstacle. Because the plastics is a relatively easily abraded material, however, the teeth wear very rapidly in some crops and require frequent replacement. In order to avoid this disadvantage, it has been proposed to protect the inner regions of the tooth profile by placing auxiliary comb plates of shorter metal teeth immediately in front of the plastics teeth (WO92/08339 or U.S. Pat. No. 5,389,038). This is only a partial solution, however, as the radially outer regions of the plastics teeth remain unprotected.

Full-length metal teeth have also been proposed, but they have not been widely employed in practice The comb plates can be stamped or cut from metal sheet and in one proposed form of metal toothing disclosed in WO86/01972, the tapering outer portion of each tooth extending from the neck of the inner portion is provided with radiused or folded edges or flanges. These are intended to give a scooping action if the edges are directed forwards, or to have a squeezing action on the crop passing between them if they are directed rearwards. Because the flanged edges increase the stiffness, the flexure of such teeth under load must be concentrated in the relatively short inner portions where the bulbous openings are formed. If the teeth strike an obstacle, the flexure of these portions may be so great as to deform them plastically. Alternatively, high levels of stress generated in the stiffened outer portions can cause buckling of the flanged edges and so permanently deform the outer portions.

In another proposed form of metal toothing, in WO96/04776, a rearwardly directed flange around substantially the entire periphery of each tooth gives the tooth a rounded edge, with the aim of providing a less aggressive action than a plain stamped edge would give while having a substantially longer working life than plastics teeth. In easily detached crops the gentler effect of this toothing can strip the crop to be harvested while minimising the detachment and uptake of other parts of the plants.

The toothing proposed in WO96/04776 is made of a relatively thin spring grade steel to give the required degree of elasticity with ease of manufacture, and it will have significant flexibility despite the flanging of its edges. The resistance of the crop stems as the stripper teeth move can therefore cause excessive flexure, reducing the efficiency of operation and in order to control the flexure of the teeth it has also been proposed to provide them with a backing of shorter and thicker plastic teeth. These plastic teeth extend outwards beyond the necks of the metal tooth inner portions but terminate some distance from the tips of the outer tapered portions of the teeth, so they are shielded from abrasion. Despite the support provided by the plastic teeth, it is found that the metal toothing is susceptible to cracking, in particular at the transition between the inner and outer portions of a tooth, which can lead to premature failure by fracture. It is proposed in WO96/04776 that the flanging can be interrupted at the angular transitions between the bulbous openings and the tapering teeth to reduce stress concentrations there, but there is a risk that this measure concentrates any flexure under load at that point and lowers the limit at which plastic deformation of the teeth will occur.

It is an object of the present invention to at least ameliorate some of the problems of the prior art metal toothing.

SUMMARY OF THE INVENTION

According to one aspect of the present invention, metal toothing is provided for a stripper rotor comprising a series of teeth disposed side by side, each tooth having an outwardly tapered outer portion extending from a radially inner root portion where the spacing between adjacent teeth increases to form a root opening having a maximum width greater than the width of the radially outer neck of the root opening at the junction with the tapering outer portions of the teeth, the teeth having flanging along each said outer portion spaced from said root portion and extending over not substantially more than 70% of the radial length of the tooth profile measured from the radially inner edge of the root opening.

Preferably, the flanging extends over not substantially more than 60% of said radial length of the teeth. In any event it is desirable to ensure that the minimum spacing between the flanges of adjacent teeth is not less than 20% of the pitch of the teeth, and is preferably not substantially less than 25% of that pitch. on the stripper rotor, such toothing can be given support from shorter backing toothing, which may be of plastics, extending from the roots of the main toothing to at least part way along the tapering outer portions of the metal toothing, preferably extending into said flanged outer region. The backing teeth can support the main teeth against bending loads in a manner which spreads the flexure of each main tooth over a greater part of its radial extent, so reducing peak stresses. Bending loads on the main teeth are reduced thereby and the flexure of the teeth can be better controlled by the support provided.

Toothing arranged according to the invention is able to offer many of the advantages of the continuously flanged toothing proposed in WO96/04776 while accommodating increased deflections under impact loading. In comparison with the flanged metal toothing proposed in WO86/01972, toothing according to the invention is able to accommodate a greater degree of flexure without damage.

According to another aspect of the invention, metal comb plate is provided for a stripper rotor comprising a series of teeth disposed side by side, each tooth having an outwardly tapered outer portion extending from a radially inner root portion where the spacing between adjacent teeth increases to form a root opening having a maximum width greater than the width of the minimum spacing between the teeth, flanging on the edges of said teeth spaced from the root opening, said flanging extending from the radially outer ends of the teeth over a radial length not substantially more than 70%, and preferably not substantially more than 60%, of the radial length of the tooth profile measured from the radially inner edge of the root openings.

Using the stripper teeth according to the invention with the flanging directed rearwards, helps to ensure that easily detached crops can be gathered without removing a significant quantity of unwanted parts of the plants, in particular the stems, where there is a risk that the unwanted material that is detached will interfere with the gathering of the crop that is being collected if it constitutes too large a quantity that must subsequently be separated to be discarded. However, there are particular crops from which the required parts are not easily detached. If the teeth are then arranged so that they can be operated with the flanging directed forwards, the leading edges of the flanging can provide a more aggressive stripping action on the crop. It may be noted that even on metal toothing, wear will occur by abrasion and in this respect the forwardly directed flanging has the advantage of increasing the life of the toothing because an active forward-facing edge will be maintained while the flanging is worn away.

In a preferred form of the invention the toothing is arranged so that it can be mounted on the rotor with the flanging directly forwards or rearwards to choice, the selection being made according to the particular crop being harvested.

The flanging on the tapering outer portions of toothing according to the invention may extend over 10% to 90% of the radial length of the tapering portion from its outer tip, preferably 30% to 80%. It can be an advantage of the gap between adjacent teeth across the inner end of the flanging is approximately equal to the width of root opening at the transition between the inner and outer tooth portions.

In a further preferred feature of the invention, the outer tip of the outwardly tapering portion of each tooth is provided with flanging of an increased depth as compared with the flanging elsewhere on the outer and/or inner portions, e.g., having a depth of 20% to 200% more than the depth of the flanging in regions further inwards from the outer tip, preferably 50% to 100%. Being the region most likely to impact or rub against obstacles, the resistance of the toothing to abrasion can thereby be considerably increased with minimal increase of material or production cost.

Embodiments of the invention will be described by way of example with reference to the accompanying diagrammatic drawings.

BRIEF DESCRIPTION OF THE DRAWINGS

FIG. 1 is a front view of a part of a comb plate having a first form of toothing according to the invention for a crop stripper, FIG. 2 is a side view in the direction II in FIG. 1, FIG. 3 is a sectional view on the plane III—III in FIG. 1.

DESCRIPTION OF THE PREFERRED EMBODIMENTS

Figure 4:
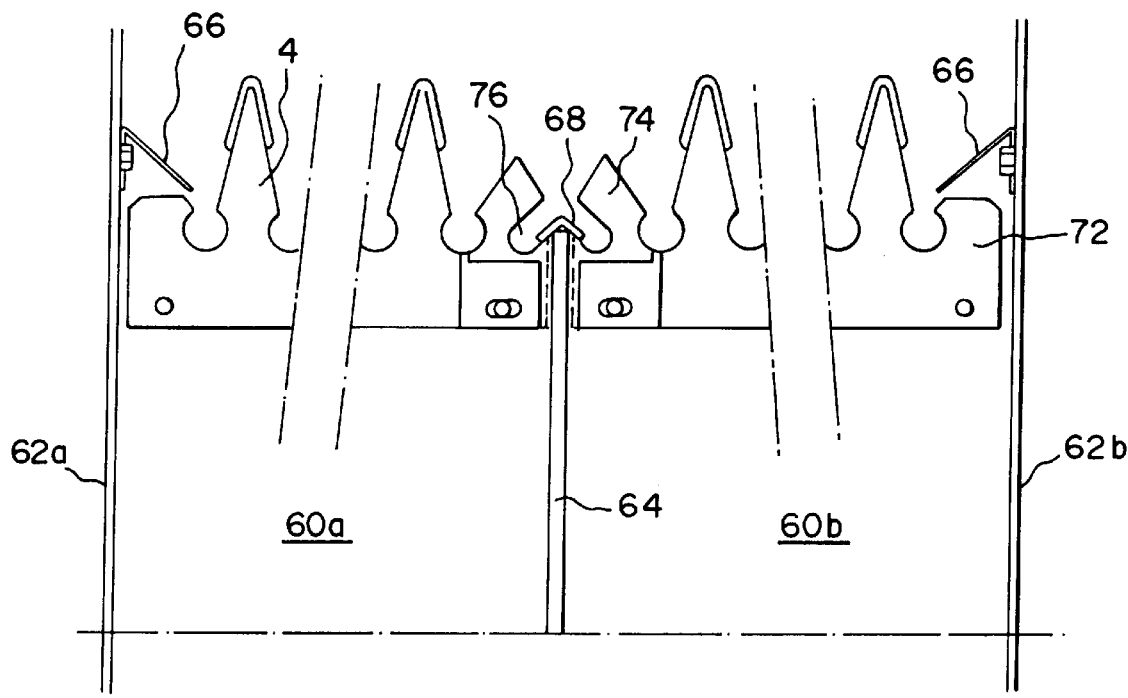
FIG. 4 is a schematic partial illustration of a crop stripper rotor mounted in place, showing in particular modified toothing arrangements at the ends of the two drums that are mounted side by side in the rotor.

FIGS. 1 and 2 illustrate a part of a comb plate 2 which may consist of a series of identical teeth 4 produced, for example, from a spring steel sheet 1 mm to 1.5 mm thick. Bolt holes 6 are provided at intervals in the comb plate for attachment of the plate to a stripper drum with the teeth projecting radially outwards. The tooth profile has a tapering radially outer portion 8 and an inner root portion 10 having a substantially arcuate edge forming root openings 12 between adjacent teeth having a maximum width greater than the spacing between the teeth at the junction of the root and outer portions.

The outer regions of the tapering portions of the teeth have peripheral flanges 14 formed by pressing an initially flat stamped blank. FIG. 1 also illustrates the shape of the blank in these regions in broken lines. The root portions of the teeth are left unflanged.

In this example, the depth of the flanges reduces progressively from the inner ends but at the extreme outer tip $8a$ of each tooth the flange depth is increased. Measured from the back face of the comb plate, ie. including the thickness of the sheet metal, the height c of the flange reduces from 5.3 mm at its inner end to 4.7 mm adjacent to the tip. At the tip itself, the height d increases to 6 mm. The height may be varied between 1 and 10 mm but it is preferably in the range of 3 to 8 mm. If the outer tip $8a$ of the tooth is formed with an increased depth of flange, the flange here may project between 1 and 10 mm beyond the main flanges, and is preferably at least 25% deeper than the main flanges, although it may be twice as deep as the main flanges, or more.

The radial extent b of each flange in relation to the radial extent t of the toothing from the inner edge of the root portion is in the ratio b/t=0.43, and it is preferably not substantially more than 0.5. If that figure is significantly exceeded for using the tooth profile illustrated, the minimum gap between the flanges of adjacent teeth can become unduly restricted. It is desirable that the minimum gap be maintained at not substantially less than 20% of the pitch of the teeth. In the illustrated example, it is preferably not substantially less than the spacing between the teeth and the junction of the root and outer portions, which in this instance is 25% of the tooth pitch.

It is also desirable to control the length b in relation to the length f of the outer tapering portion 8 of the tooth. In the illustrated example, the ratio b/f=0.55 and its most preferred range is 0.65 to 0.4. The ratio b/f can be varied between 0.1 and 0.9, but is desirably kept within the range 0.2 to 0.8.

The angle e between the normal to the main plane of the tooth and the tangent to the outer edge region of the flange 14 is 23°. The preferred range of angle is between 0° and 60°. The flange 14 is shown with a relatively small radius of curvature at its junction $14a$ with the main body of the tooth, but it may be continuously curved over at least the greater part of its depth, preferably with a substantially constant radius of curvature.

The stripping effect of the known toothing profile referred to, with the bulbous root openings formed between adjacent teeth is believed to be significantly dependent on the "keyhole" form imparted by the re-entrant edges of the teeth. It will be noted from FIG. 1 that the flanging along the outer regions of the tapering outer portions of the teeth can provide a further re-entrant region where the flanging terminates. The stripping effect can be enhanced by this modification of the tooth profile. In this illustrated example, the width of the gap between the teeth at the inner ends of flanges 14 is approximately equal to the gap at the necks of the root portions.

FIG. 1 also illustrates a backing plate 18 of considerably thicker plastics material which is clamped against the back face of the comb plate to support it against flexure under load. The backing plate has teeth 20 which lie within the profile of the comb plate teeth so they are not exposed to abrasion from the crop through which the teeth move. The backing plate teeth 20 preferably extend into the flanged outer regions of the comb plate teeth 4 but end short of the tips of the teeth 4. Preferably they extend over the inner 20–50% of the radial length of the comb teeth flanging. In the illustrated example the figure is approximately 30%.

The use of a backing plate for support in the circumferential direction can help to spread the flexural deflection of the comb plate over a greater part of its radial extent, so increasing the maximum flexure that can be imposed without exceeding the elastic limit of the material. Such backing plates also allow the use of a relatively thin metal plate which would otherwise bend too easily to circumferential forces in use. The backing plates may also be of metal, but because they are also largely kept out of direct contact with the crop it is also convenient to use plastics materials.

Figure 5:
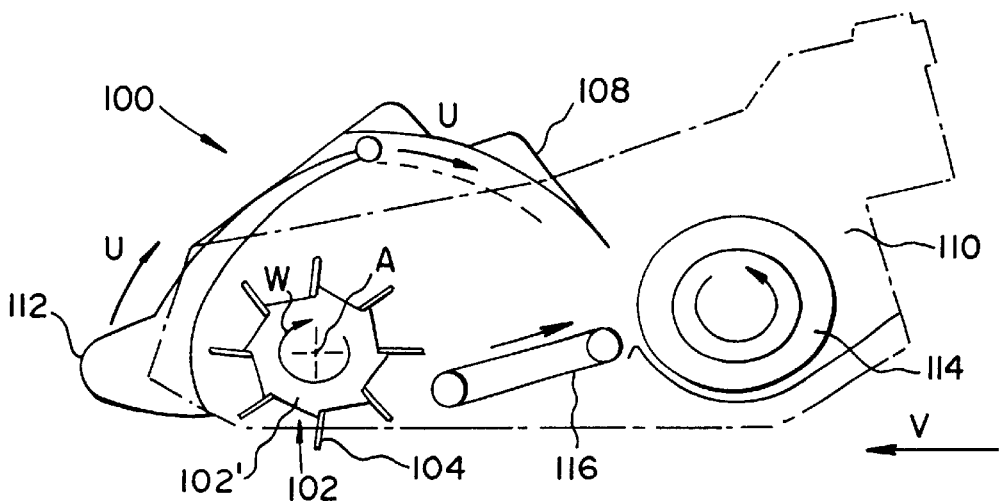
FIG. 5 is a side view of a crop stripper in which a stripper rotor having the toothing of the preceding figures is incorporated.

FIG. 4 illustrates toothing according to the invention mounted in place in a crop stripper rotor to show preferred modified toothing forms used at the ends of the stripper rotor. In this example the rotor comprises two drums 60a, 60b mounted coaxially side by side in the stripper on a common drive shaft (not shown). The crop stripper is indicated only fragmentarily as in this embodiment, like the preceding embodiment, it can be of generally known form, as shown in FIG. 5. The division of the rotor in this manner allows the length to be increased by providing a support for the drive shaft intermediate its length. Each drum is therefore rotatably supported at one end in a side plate 62a or 62b of the stripper frame and at the other end in a central division plate 64 of the frame.

The main length of each drum carries toothing of the form shown in FIGS. 1–3. At the ends of each drum, however, angled ribs 66, 68 on the side plates and the central plate respectively overlap the ends of the drum to divert crop stems away from the supporting plates of the stripper frame where they can wrap around the rotor shaft. The toothing is modified in these regions accordingly. At the outer ends of the rotor there are stub teeth 72 completely overlapped by the diverting ribs 66 and so not having any stripping action. To each side of the intermediate plate there 64 each row of toothing ends with a shorter tooth 74 of thicker plate, with a canted profile and asymmetric root opening 76 to complement the action of the V-form diverting rib 68. Reference can be made to WO93/13462 where such arrangements are described in more detail.

For further illustration of the invention, FIG. 5 shows a crop stripper 100 having a rotor with the toothing described above. The crop stripper 100 is intended to be fitted to a combine harvester (not shown) in place of the conventional header with cutter bar and receives its drive from a power take-off shaft (not shown) in the known manner. The rotor 102 of the stripper comprises a central drum or core 102' with rows 104 of the toothing projecting radially at equal angular intervals about its periphery. The rotor may have a single drum or multiple, co-axial drums as indicated earlier. The crop stripper is supported above the ground so that, in use, the rotor teeth can engage the lowest crop parts to be stripped.

The rotor 102 is located within a downwardly open casing 108 comprising side walls 110, indicated only schematically, and a front cover 112 that is adjustable, as indicated by the arrows U, to vary the front clearance to suit the crop. The stripper 100 is driven forwards into the crop, in the arrowed direction V, as the rotor turns about its central axis A in the clockwise direction W, as seen in the drawing, to strip the crop, eg. to remove the grain or grain heads from standing cereal plants. The stripped crop is thrown backwards within the casing, directly into an auger 114, or carried to the auger on a conveyor belt 116. From the auger 114 the crop is transferred into hoppers in the combine harvester body in conventional manner that needs no further description.

The flanged toothing forms described above can be arranged to be mounted on the stripper rotor 102 so that the flanges project forwards or rearwards in the direction of rotation. Preferably, the mounting means (not shown) on the rotor allow the same comb plate to be mounted facing in either direction. The user can then choose the manner of mounting in accordance with the type of crop to be harvested. Thus, crops from which the parts to be gathered are very readily detachable can be harvested with the flanges directed rearwardly with respect to the direction of rotation, their radiussed edges then being brought against the plants to reduce any tendency of other parts of the plants to be detached. With crops which require a more aggressive stripping action to remove the wanted parts, this may be more readily achieved if the flanges are directed forwardly.

What is claimed is:

1. A crop stripper rotor comprising at least one series of stripping teeth disposed side by side at a spacing from each other, said teeth extending radially outwardly from the axis of rotation of the rotor, each tooth having a profile with a root portion in a radially inner region relative to the rotor axis and a radially outer tapering portion relative to the rotor axis tapering towards a radially outer tip of the tooth, a neck portion between said inner root portion and said outer tapering portion, the spacing between each adjacent pair of teeth being increased in said root portions to form a root opening between said pair of teeth having a maximum width greater than the spacing between the teeth at said neck portion, flanging along said tapering outer portions of the teeth, said flanging extending over between 10% and 90% of the radial length of said outer tapering portions from said radially outer tips.

2. A rotor according to claim 1 wherein said flanging extends over not substantially more than 60% of a radial length of the tooth profile measured in a radial direction from the radially inner extremity of the root opening.

3. A stripper rotor according to claim 1 wherein said series of teeth have a pitch defined as the distance between the centers of successive root openings, and the minimum spacing between the flanging of adjacent teeth is not less than 20% of the pitch of the teeth.

4. A stripper rotor according to claim 3 wherein the minimum spacing between the flanging of adjacent teeth is not substantially less than 25% of said pitch.

5. A stripper rotor according to claim 1 wherein a gap between adjacent teeth across radially inner ends of the flanging is approximately equal to the width of the root openings at said neck portions.

6. A stripper rotor according to claim 1 wherein said flanging on the tapering outer portions of the teeth extends between 30 to 80% of said radial length.

7. A stripper rotor according to claim 1 wherein the flanging extends around the outer tip of the outwardly tapering portion of each tooth, the tip flanging having an increased depth relative to the flanging radially inwards of said outer tip.

8. A stripper rotor according to claim 7 wherein said tip flanging is at least 25% deeper than the flanging radially inwards of said outer tip.

9. A stripper rotor according to claim 7 wherein said tip flanging has a depth of 20% to 200% more than the flanging radially inwards from said tip.

10. A stripper rotor according to claim 9 wherein said tip flanging has a depth between 50% and 100% more than the flanging radially inwards from said tip.

11. A stripper rotor according to claim 1 wherein the depth of the flanging on each said tooth reduces from a radially inner end of the flanging over at least a major portion of the radial extent thereof.

12. A stripper rotor according to claim 11 wherein the flanging depth varies in the range of 1 mm to 10 mm.

13. A stripper rotor according to claim 12 wherein the flanging depth varies in the range of 3 mm to 8 mm.

14. A stripper rotor according to claim 6 wherein said flanging on the tapering outer portions of the teeth extends between 40% and 65% of said outer portion length.

15. A stripper rotor according to claim 1 wherein the flanging of each tooth is inclined from a main plane of the tooth from which it extends at an angle of between 0° and 60° as measured between a normal to said main plane and a tangent to an outer edge region of the flanging.

16. A stripper rotor according to claim 1 wherein the flanging has a continuously curved section transverse to each tooth over at least a greater part of its depth.

17. A stripper rotor according to claim 1 wherein backing supports are provided behind said series of teeth, said supports comprising further teeth extending radially outwardly beyond the root portions of said series of teeth and at least part way along the tapering outer portions of said series of teeth.

18. A stripper rotor according to claim 17 wherein said further teeth are formed from plastic and are thicker than said series of teeth.

19. A stripper rotor according to claim 17 wherein said further teeth extend into the flanged outer portions of said series of teeth.

20. A stripper rotor according to claim 19 wherein said further teeth extend over the inner 20–50% of the radial length of the flanging of said series of teeth.

21. A stripper rotor according to claim 1 wherein the stripping teeth are selectably mountable in place on the rotor with the flanging extending either forwards or rearwards with respect to a chosen direction of rotation of the rotor.

22. A crop stripper having a rotor comprising a central core and a plurality of series of stripping teeth projecting radially outwardly from an outer periphery of the core at equal angular intervals, in each said series the teeth being disposed side by side at a spacing from each other, each tooth having a profile with a radially inner root portion adjacent to said core periphery and a radially outer portion tapering towards a radially outer tip of the tooth, a neck portion between said inner root portion and said outer tapering portion, the spacing between each adjacent pair of teeth being increased in said root portions to form a root opening between said pair of teeth having a maximum width greater than the spacing between the teeth at said neck portion, said root opening having a radially inner extremity, flanging along said tapering outer portions of the teeth, said flanging extending from said tip over not substantially more than 60% of a radial length of the tooth profile measured from the radially inner extremity of the root opening and terminating outwardly from said neck portion.

23. A comb plate comprising a series of stripping teeth for a stripper rotor, the teeth being disposed side by side at a spacing from each other, each tooth extending radially outwardly relative to the axis of the rotor and having a profile with a radially inner root portion and a radially outer portion tapering towards an outer tip of the tooth, a neck portion between said inner root portion and said outer tapering portion, the spacing between each adjacent pair of teeth being increased in said root portions to form a root opening between said pair of teeth having a maximum width greater than the spacing between the teeth at said neck portion, said root opening having an inner extremity, flanging along said tapering outer portions of the teeth, said flanging extending from said tip over not substantially more than 60% of a length of the tooth profile between said outer tip and the inner extremity of the root opening and terminating outwardly from said neck portion.

24. A comb plate for a stripper rotor comprising a series of metal stripping teeth disposed side by side at a spacing from each other, each tooth extending radially outwardly relative to the axis of the rotor and having a profile with a radially inner root portion and a radially outer portion tapering towards a radially outer tip of the tooth, a neck portion between said inner root portion and said outer tapering portion, the spacing between each adjacent pair of teeth being increased in said root portions to form a root opening between said pair of teeth having a maximum width greater than the spacing between the teeth at said neck portion, flanging on edges of said teeth spaced from the root portions, said flanging extending from the outer tips of the teeth over between 10% and 90% of the radial length of said tapering portions.

25. A comb plate according to claim 24 wherein said flanging extends from the outer tips over not substantially more than 60% of the length of the tooth profile between said outer tip and the radially inner extremity of the root opening.

* * * * *